(12) United States Patent
Lawson (10) Patent No.: US 10,746,359 B2
(45) Date of Patent: Aug. 18, 2020

(54) CORNER BRACKET

(71) Applicant: Peak Innovations inc., Richmond (CA)

(72) Inventor: Craig Lawson, Burnaby (CA)

(73) Assignee: Peak Innovations Inc., Richmond (CA)

( * ) Notice: Subject to any disclaimer, the term of this patent is extended or adjusted under 35 U.S.C. 154(b) by 159 days.

(21) Appl. No.: 15/546,261

(22) PCT Filed: Jan. 27, 2015

(86) PCT No.: PCT/CA2015/050054
§ 371 (c)(1),
(2) Date: Jul. 25, 2017

(87) PCT Pub. No.: WO2016/119038
PCT Pub. Date: Aug. 4, 2016

(65) Prior Publication Data
US 2018/0073693 A1    Mar. 15, 2018

(51) Int. Cl.
| | | |
|---|---|---|
| *F21S 4/20* | (2016.01) | |
| *F21V 33/00* | (2006.01) | |
| *E04H 17/14* | (2006.01) | |
| *E04F 11/18* | (2006.01) | |
| *F16M 13/02* | (2006.01) | |
| *F21Y 115/10* | (2016.01) | |
| *F21Y 103/10* | (2016.01) | |
| *F16B 7/04* | (2006.01) | |
| *F21S 4/22* | (2016.01) | |

(Continued)

(52) U.S. Cl.
CPC ............... *F21S 4/20* (2016.01); *E04F 11/18* (2013.01); *E04H 17/1443* (2013.01); *F16M 13/025* (2013.01); *F21V 33/006* (2013.01); *E04F 2011/1872* (2013.01); *E04H 2017/1447* (2013.01); *F16B 7/0493* (2013.01); *F21S 4/22* (2016.01); *F21S 4/28* (2016.01); *F21W 2111/08* (2013.01); *F21Y 2103/10* (2016.08); *F21Y 2115/10* (2016.08)

(58) Field of Classification Search
CPC ........ F21W 2111/08; F21S 2/00; F21S 2/005; E04H 2017/1447; E04F 2011/1872; F16M 13/025; F21V 23/002
See application file for complete search history.

(56) References Cited

U.S. PATENT DOCUMENTS

| | | | |
|---|---|---|---|
| 782,366 A | | 2/1905 | Stroud |
| 2,233,280 A | * | 2/1941 | Barnes ................ F21S 8/00 |
| | | | 362/319 |

(Continued)

FOREIGN PATENT DOCUMENTS

| | | | | |
|---|---|---|---|---|
| DE | 202010000363 U1 | * | 4/2011 | ............ F21S 4/24 |
| JP | 3935341 | | 6/2007 | |

*Primary Examiner* — Alexander K Garlen
*Assistant Examiner* — Colin J Cattanach
(74) *Attorney, Agent, or Firm* — Smiths IP; Lawrence Chan (57) ABSTRACT

A bracket for securing an accessory (e.g. a light strip) to a structure (e.g. a railing) comprises an attachment portion and a cover portion. The cover portion is removably attached to the attachment portion. When the two portions are attached together, a channel is formed for holding the accessory. The attachment portion comprises a planar portion with one or more openings adapted to receive fasteners for attaching the attachment portion to the structure.

20 Claims, 6 Drawing Sheets

(51) Int. Cl.
*F21W 111/08* (2006.01)
*F21S 4/28* (2016.01)

(56) References Cited

U.S. PATENT DOCUMENTS

| | | | | |
|---|---|---|---|---|
| 2,721,255 | A * | 10/1955 | Lanmon | F21V 33/006 362/146 |
| 4,161,769 | A * | 7/1979 | Elliott | E04F 11/1836 362/146 |
| 4,394,718 | A | 7/1983 | Balzer | |
| 4,413,311 | A * | 11/1983 | Orenstein | E05B 1/0015 362/145 |
| 6,061,991 | A * | 5/2000 | Dahl | E01D 19/103 52/832 |
| 6,065,852 | A * | 5/2000 | Crumley | G02B 6/0006 362/146 |
| 7,575,499 | B2 * | 8/2009 | Tufte | G09F 13/22 446/219 |
| 8,297,777 | B1 * | 10/2012 | McCall | F21V 33/006 362/145 |
| 9,004,715 | B1 * | 4/2015 | Litke | F21V 21/35 362/217.15 |
| 2004/0179358 | A1 * | 9/2004 | Tufte | B60Q 1/32 362/223 |
| 2007/0032319 | A1 * | 2/2007 | Tufte | G09F 13/22 473/570 |
| 2014/0223745 | A1 * | 8/2014 | Eberhart | F16B 7/044 29/897.31 |
| 2016/0327728 | A1 * | 11/2016 | Gawel | G02B 6/0035 |

* cited by examiner

CORNER BRACKET

FIELD OF THE INVENTION

The invention relates to the field of fencing, and in particular, to a bracket for holding a light strip for a railing.

BACKGROUND OF THE INVENTION

Railing systems for any number of outdoor applications are well-known. For example, residential decks, pool decks, playgrounds all utilize any number of conventional railing systems. A conventional railing system typically comprises one or more elongated railings, with one or both ends of the railings supported by generally vertical posts. The posts and the railings may be attached together using a variety of connectors or fasteners. One exemplary railing system is the RailBlazers® system manufactured by Peak Innovations Inc. and generally disclosed in U.S. Pat. No. 7,677,000 to Walker. This railing system comprises upper and lower aluminum railings with vertical aluminum posts on either ends of the railings. The posts comprise an open-ended head and a lower rail support to snugly receive the upper and lower railings, respectively. One or more vertical pickets may span the upper and lower railings.

It may sometimes be desirable to incorporate some form of illumination to a railing system. For example, illumination may provide a safety benefit by increasing visibility around the railing system, especially at night. Alternatively, illumination may increase the overall aesthetic appeal of the railing system.

SUMMARY OF THE INVENTION

According to one aspect of the invention, a bracket for securing an accessory to a structure comprises an attachment portion and a cover portion. The attachment portion comprises a planar portion and a body portion. The planar portion comprises one or more openings adapted to receive fasteners for attachment of the planar portion to the structure. The body portion extends proximate to one end of the planar portion and comprises an arm and a partial cutout. The cover portion is removably attached to the attachment portion and comprises a base, a first wall, and a second wall. At least a portion of the base is curved. The first wall extends from at least a first portion of the base, and the first wall engages with the planar portion. The second wall extends from at least a second portion of the base and is spaced apart from the first wall. The second wall engages with the arm. The attachment portion and the cover portion form a channel for holding the accessory.

In another aspect of the invention, the channel extends for the length of the base.

In a further aspect of the invention, the channel comprises a first end and a second end. The first end is a first opening in the bracket, and the second end is a second opening in the bracket.

In yet a further aspect of the invention, the first opening is defined, at least in part, by the base, the first wall, and the planar portion.

In still a further aspect of the invention, the second opening is defined, at least in part, by the partial cutout and the second wall.

In another aspect of the invention, the first opening and the second opening are vertically offset from one another.

In yet another aspect of the invention, the arm extends from the body portion in a direction substantially parallel with the planar portion.

In still another aspect of the invention, the arm extends from the body portion at a distance from the planar portion.

In another aspect of the invention, the partial cutout comprises an arc.

In a further aspect of the invention, the first wall and the second wall extend substantially parallel to one another.

In still a further aspect of the invention, the arm comprises a ledge and an upright member extending substantially perpendicular to the ledge.

In yet a further aspect of the invention, the second walls engages with the ledge.

In another aspect of the invention, the first wall comprises one or more first tabs, with the first tabs engaging with the planar portion.

In still another aspect of the invention, the second wall comprises one or more second tabs, with the second tabs engaging with the arm.

In a further aspect of the invention, the first wall comprises a curvature.

In still a further aspect of the invention, the attachment portion further comprises an open slot defined, at least in part, by the planar portion, the body portion, and the arm.

In yet a further aspect of the invention, the base comprises a planar section proximate to one end of the base.

In another aspect of the invention, a bracket for securing a light strip to a railing comprises an attachment portion and a cover portion. The attachment portion comprises a planar portion and a body portion. The planar portion comprises one or more openings adapted to receive fasteners for attachment of the planar portion to the railing. The body portion extends proximate to one end of the planar portion and comprises an arm and a partial cutout. The cover portion is removably attached to the attachment portion and comprises a base, a first wall, and a second wall. At least a portion of the base is curved. The first wall extends from at least a first portion of the base, and the first wall engages with the planar portion. The second wall extends from at least a second portion of the base and is spaced apart from the first wall. The second wall engages with the arm. The attachment portion and the cover portion form a channel for holding the light strip.

The foregoing was intended as a summary only and of only some of the aspects of the invention. It was not intended to define the limits or requirements of the invention. Other aspects of the invention will be appreciated by reference to the detailed description of the preferred embodiments. Moreover, this summary should be read as though the claims were incorporated herein for completeness.

BRIEF DESCRIPTION OF THE DRAWINGS

The preferred embodiment of the invention will be described by reference to the drawings thereof, in which.

DETAILED DESCRIPTION OF THE DRAWINGS

Figure 1:
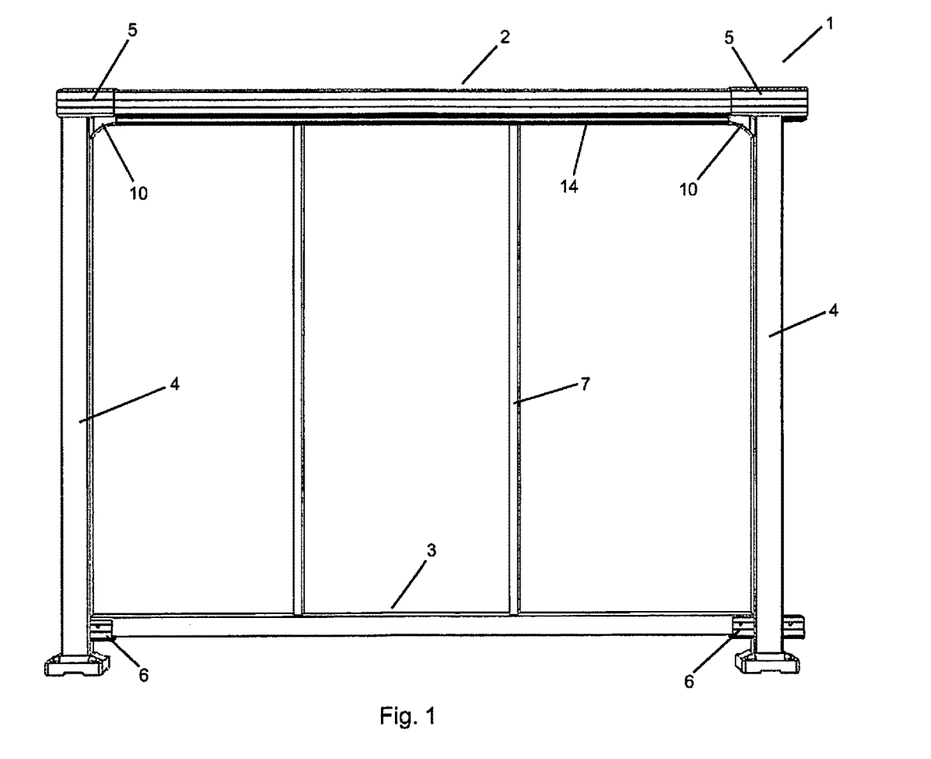
FIG. 1 is a front view showing a bracket in accordance with present invention attached to a railing system.
Figure 2:
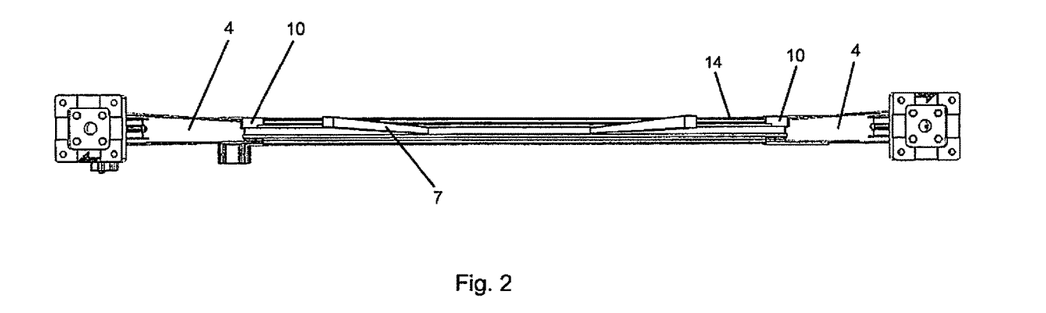
FIG. 2 is a partial bottom view showing the bracket of FIG. 1 attached to the railing system.

Referring to FIGS. 1 and 2, one or more brackets 10 according to the present invention are attached to an exemplary railing system 1. The railing system 1 comprises one or more upper railings 2 and lower railings 3 spanning one or more substantially vertical posts 4. In the railing system 1 depicted in FIGS. 1 and 2, the posts 3 comprise open-ended heads 5 and lower rail supports 6 shaped to receive the upper railings 2 and lower railings 3, respectively. However, it is understood that other means of connecting the upper and lower railings 2, 3 to the posts 4 are also possible, such as by connectors or brackets. In addition, one or more substantially vertical pickets 7 may also span the upper and lower railings 2, 3.

The brackets 10 are preferably attached to one or both of the upper and lower railings 2, 3. For example, in the embodiment shown in FIGS. 1 and 2, the brackets 10 are attached to the underside of the upper railing 2, proximate to the ends of the upper railing 2 (e.g. adjacent to the posts 4). Alternatively, the brackets 10 may also be attached to the top of the upper railing 2 or to the top or underside of the lower railing 3.

The brackets 10 may be used to secure one or more accessories to the railing system 1. In one embodiment, the brackets 10 are used in conjunction with one (or more) light strips 12, and the light strip 12 may extend along the length of the upper railing 2 or the lower railing 3. In the embodiment shown in FIGS. 1 and 2, the light strip 12 extends along the underside of the upper railing 2. Furthermore, the light strip 12 may be contained within a rail 14, which is itself attached to the upper railing 2. One such rail 14 is described and disclosed in PCT Application No. PCT/CA2014/000888 filed Dec. 11, 2014 entitled "Accessory Holder for Railing System". The light strip 12 may extend beyond the ends of the upper railing 12. The brackets 10 are able to accept the ends of the light strip 12 and may hide portions of the light strip 12 from view. FIGS. 10 to 13 show the bracket 10 used in conjunction with the light strip 12. However, it is understood that other accessories may be used with the bracket 10, including cords, decorative strips, and the like.

Figure 11:
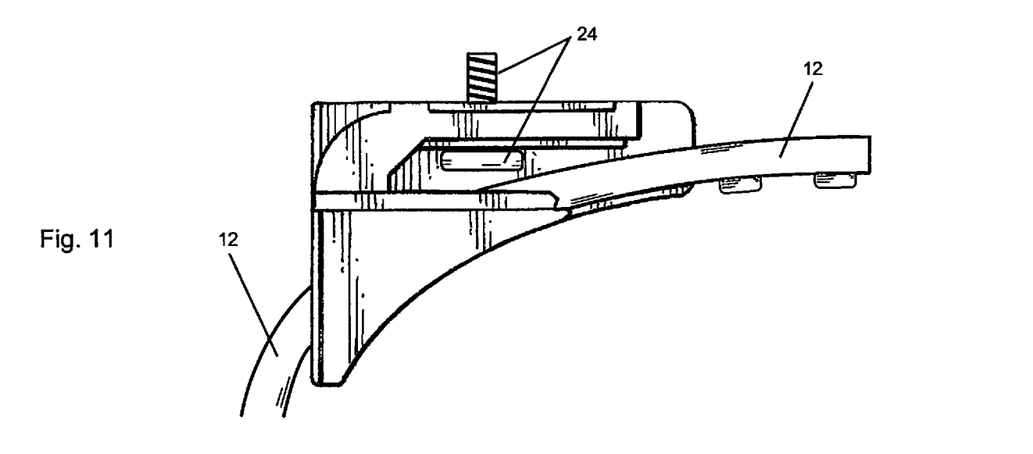
FIG. 11 is a front view of the bracket with the light strip and a fastener.

Referring to FIGS. 3 to 17, each of the brackets 10 comprises an attachment portion 16 and a cover portion 18. The attachment portion 16 comprises a planar portion 20 that comprises a fastener opening 22 that extends through the planar portion 20. The fastener opening 22 is sized and adapted to receive a fastener 24 that secures the planar portion 20 to the railings 2, 3 (as best shown in FIG. 11). The fasteners 24 may include screws, bolts, or the like. In the embodiment shown in FIGS. 3 to 17, the fastener opening 22 is elongated to allow the fastener 24 to be located anywhere along the elongated fastener opening 22. The bracket 10 may be positioned such that it sits below the railing 2 and abutting one of the posts 4 (as shown in FIGS. 1 and 2). In another embodiment, the bracket 10 may be positioned such that it sits on top of railing 3 and abutting one of the posts 4.

Figure 14:
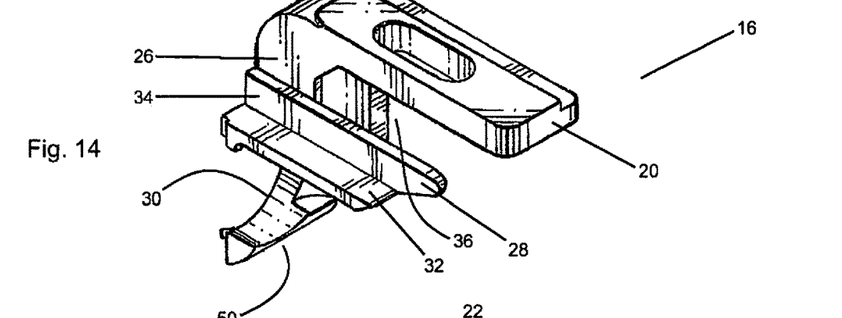
FIG. 14 is a perspective view of the attachment portion of the bracket.
Figure 15:
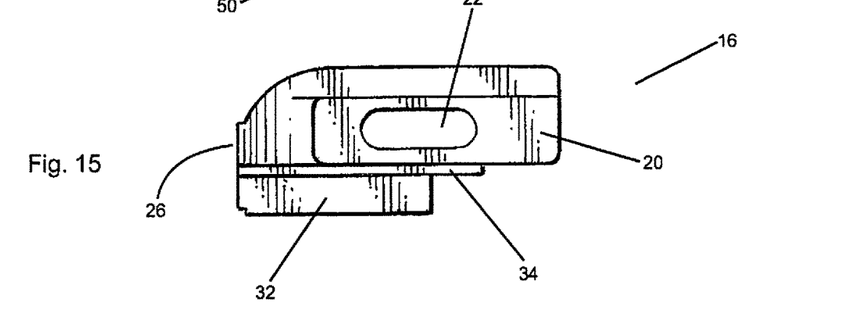
FIG. 15 is a top view of the attachment portion of FIG. 14.

As best shown in FIGS. 14 and 15, the attachment portion 16 further comprises a downwardly-extending body portion 26. Preferably, the body portion 26 extends proximate or at one end of the planar portion 20. The body portion 26 comprises a generally horizontally-extending arm 28 and a partial cutout 30. In the embodiment shown in FIGS. 3 to 17, the partial cutout 30 is open on one side of the body portion 26.

The arm 28 preferably comprises a substantially horizontal ledge 32, with an upright member 34 extending substantially perpendicular to the ledge 32. Preferably, the arm 28 extends from the body portion 26 at a distance apart from the planar portion 20 such that an open slot 36 is formed.

Figure 12:
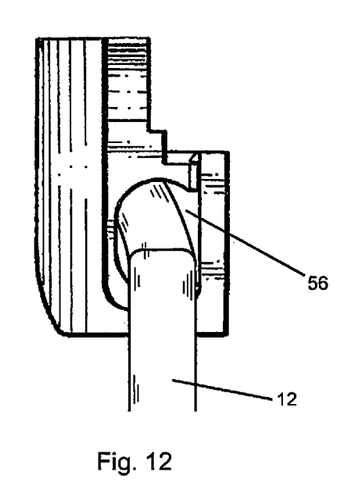
FIG. 12 is a left side view of the bracket with the light strip.
Figure 13:
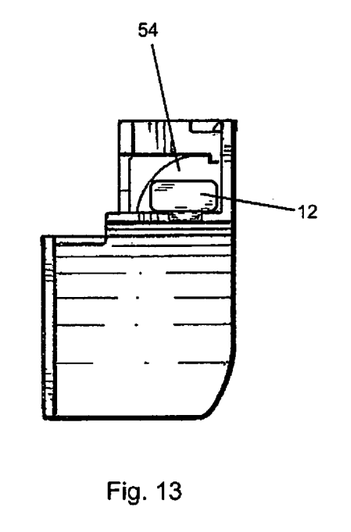
FIG. 13 is a right side view of the bracket with the light strip.
Figure 16:
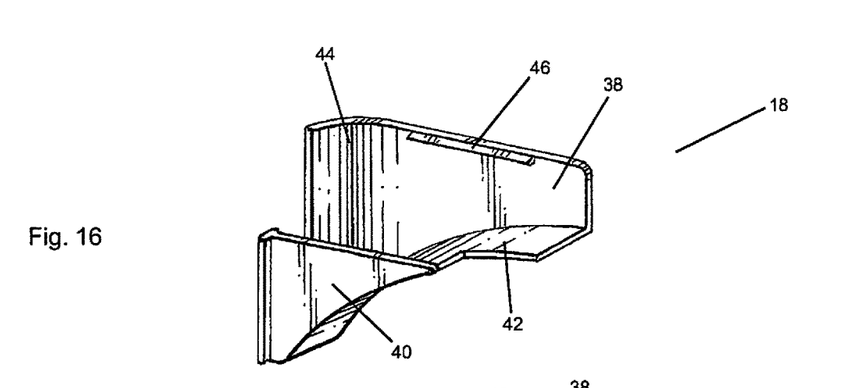
FIG. 16 is a perspective view of the cover portion of the bracket.
Figure 17:
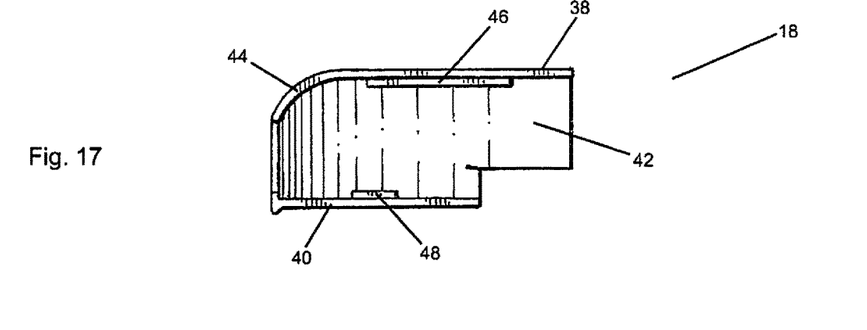
FIG. 17 is a top view of the cover portion of FIG. 16.

As best shown in FIGS. 16 and 17, the cover portion 18 comprises a first wall 38, a second wall 40, and a base 42. Preferably, the base 42 is substantially curved, the base 42 may also comprise a planar section 43 proximate to one end of the base 42. As shown in FIG. 12, the first wall 38 and the second wall 40 preferably extend substantially vertically from at least portions of the base 42. The first wall 38 preferably extends to a greater height than the second wall 40. In the embodiment shown in FIGS. 3 to 17, the first wall 38 extends to a height beyond the height of the base 42, whereas the second wall 40 extends to almost the height of the base 42. A portion of the first wall 38 may also comprise a curvature 44 proximate to one end of the base 42.

The first wall 38 may comprise one or more first tabs 46, and the second wall 40 may comprise one or more second tabs 48. The first tabs 46 and the second tabs 48 assist in securing the attachment portion 16 to the cover portion 18. In the embodiment shown in FIGS. 3 to 17, each of the first tabs 46 and the second tabs 48 comprises a single, long tab. However, it is contemplated that the first tabs 46 may also comprise a greater number of shorter tabs. Similarly, it is also contemplated that the second tabs 48 may comprise a greater number of shorter tabs as well.

Figure 3:
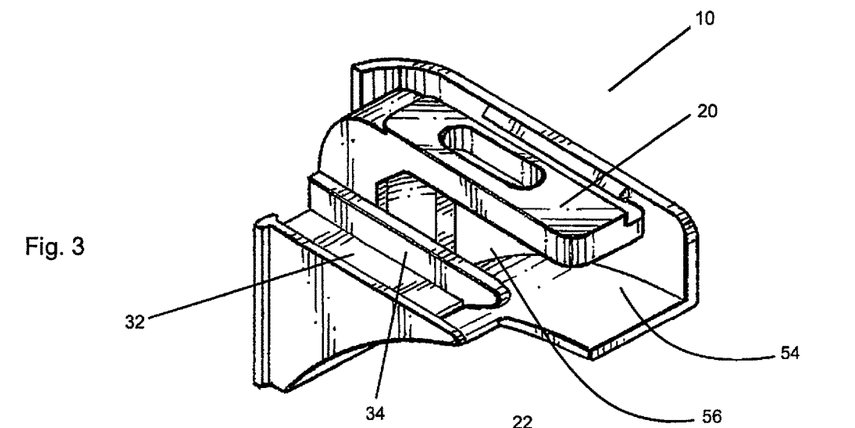
FIG. 3 is a perspective view of the bracket.
Figure 4:
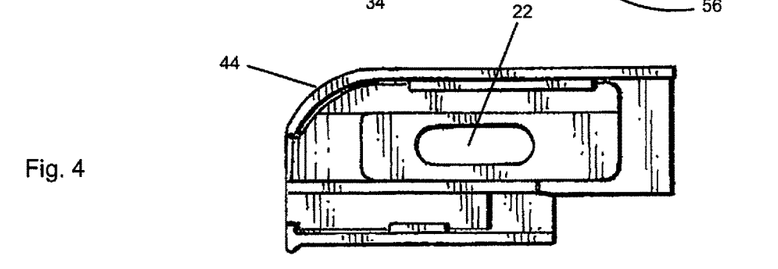
FIG. 4 is a top view of the bracket.
Figures 5, 6:
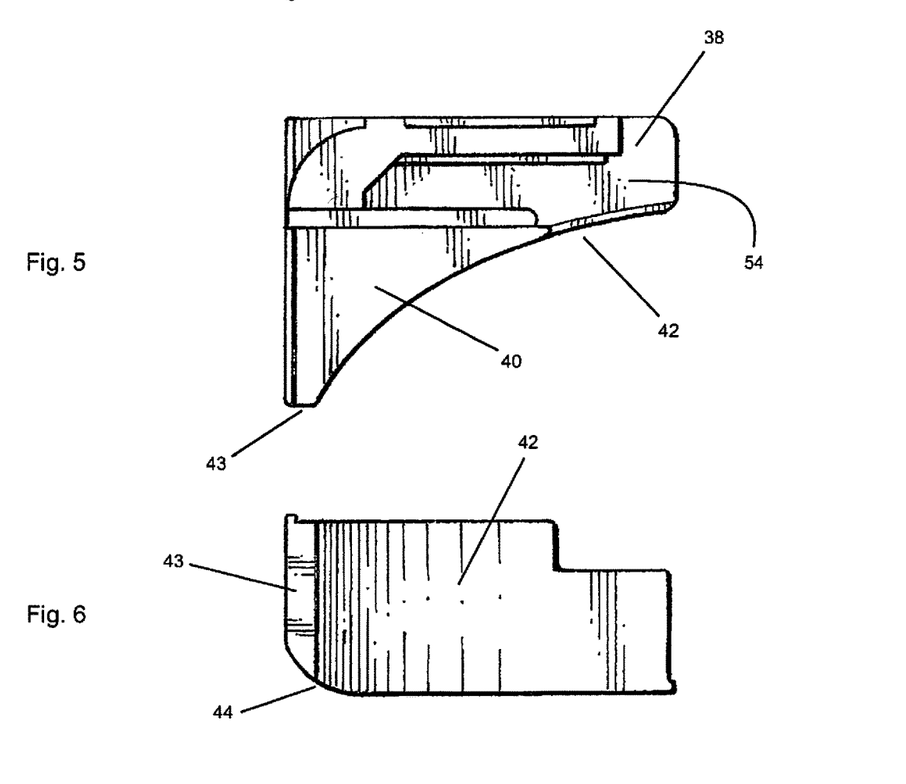
FIG. 5 is a front view of the bracket.
FIG. 6 is a bottom view of the bracket.
Figure 7:
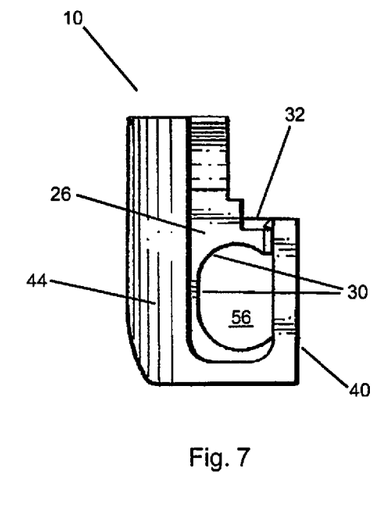
FIG. 7 is a left side view of the bracket.
Figure 8:
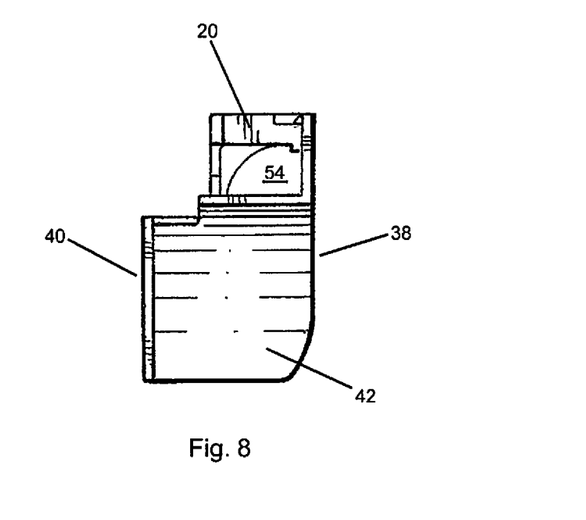
FIG. 8 is a right side view of the bracket.
Figure 9:
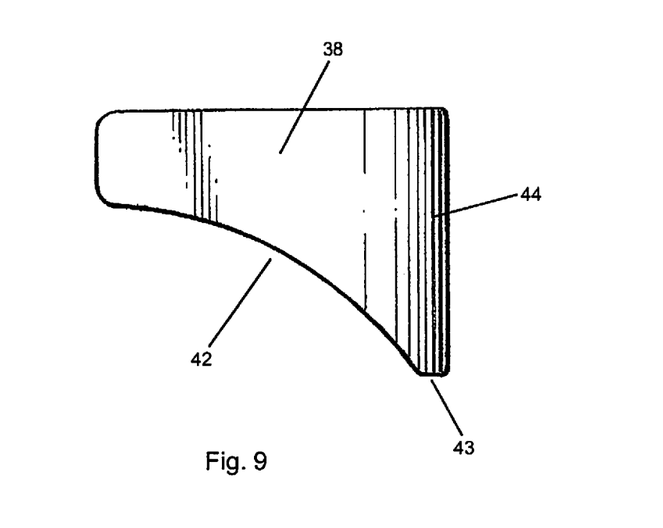
FIG. 9 is a rear view of the bracket.
Figure 10:
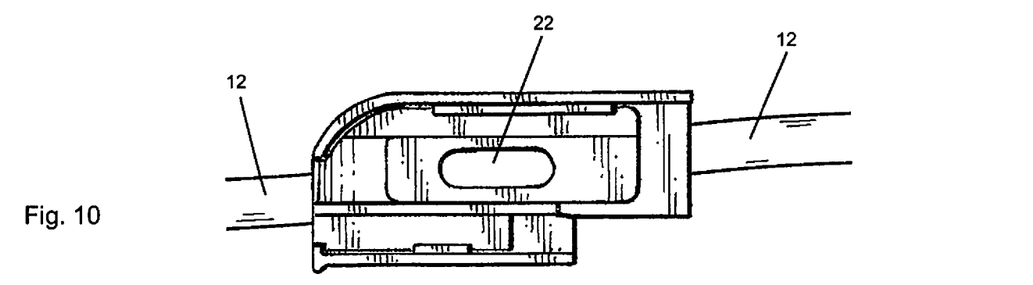
FIG. 10 is a top view of the bracket with a light strip secured to the bracket.

As best seen in FIGS. 3 to 5, when the attachment portion 16 is secured to the cover portion 18, the first tabs 46 engage with the planar portion 20. Furthermore, the second tabs 48 engage with the ledge 32. The engagement of the first tabs 46 with the planar portion 20 and the engagement of the second tabs 48 with the ledge 32 holds the attachment portion 16 in place from the top. The attachment portion 16 is further held in place by the engagement of the curvature 44 against the body portion 26, which holds the attachment portion 16 in place from the rear. The base 42 engages a bottom 50 of the body portion 26 and holds the attachment portion 16 in place from below. Preferably, a portion of the bottom 50 is also curved to match with the curvature in the base 42. The first wall 38 engages the planar portion 20 and the second wall 40 engages with the ledge 32 to hold the attachment portion 16 in place from the sides.

When the attachment portion 16 is attached to the cover portion 18 to form the bracket 10, a channel 52 is formed that extends along the length of the bracket 10, with a first channel opening 54 at one end of the bracket 10 and a second channel opening 56 at the other end of the bracket 10. The first channel opening 54 is defined, in part, by the base 42, the first wall 38, and the planar portion 20, whereas the second channel opening 56 is defined, in part, by the cutout 30 and the second wall 40.

The channel 52 does not extend horizontally straight across the bracket 10. Instead, the channel 52 follows the base 42. As a result, the first channel opening 54 and the second channel opening 56 are vertically offset from one another. Therefore, when the bracket 10 is used in conjunction with the light strip 12, for example, the light strip 12 may enter the bracket 10 through the first channel opening 54 at a certain height and exit the bracket 10 through the second channel opening 56 at a different height. This is best shown in FIGS. 10 to 13.

Figure 18:
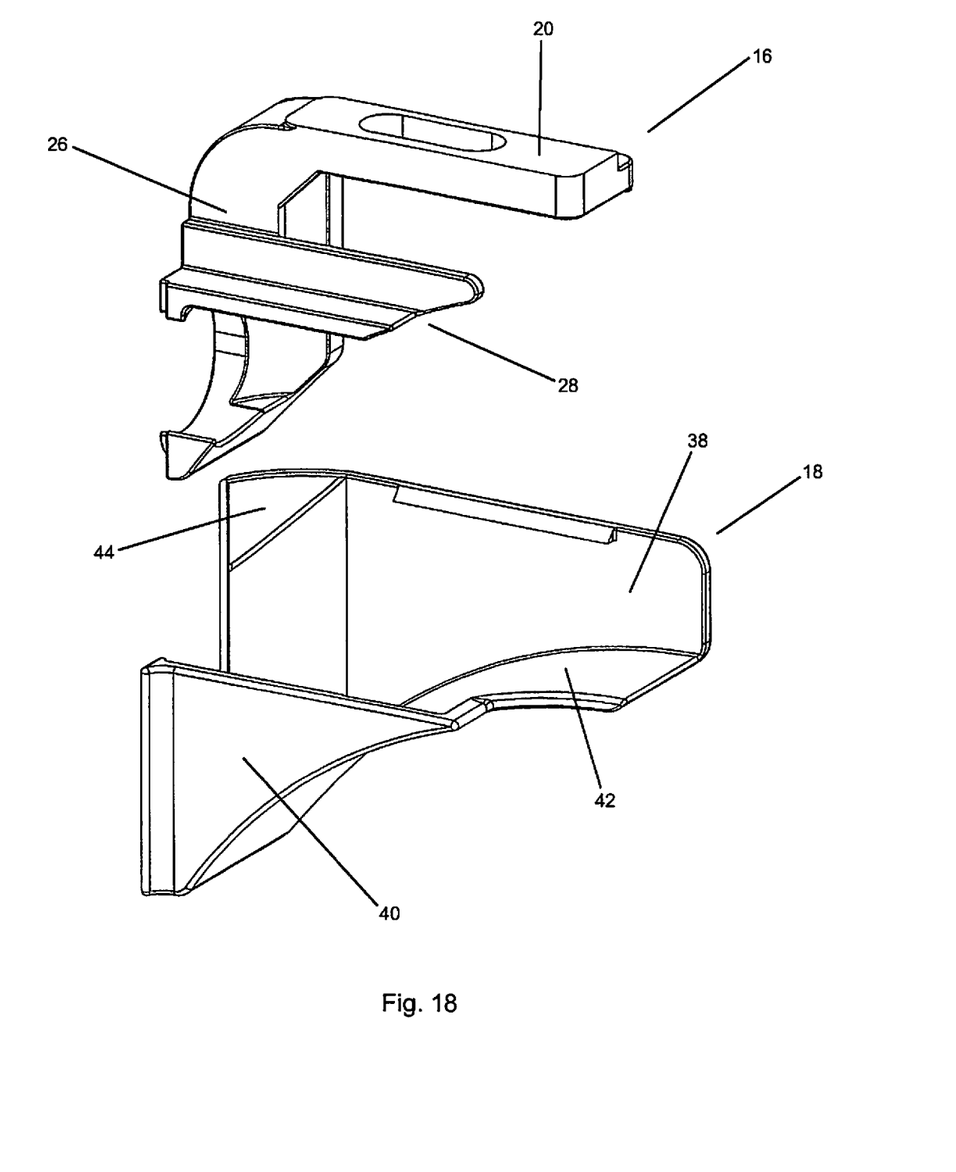
FIG. 18 is an exploded view of the bracket.

Referring to FIG. 18, to secure the attachment portion 16 to the cover portion 18, the attachment portion 16 is inserted into the cover portion 18 from above. However, the first tabs 46 and the second tabs 48 prevent the attachment portion 16 from being easily inserted into the cover portion 18. In particular, the first tabs 46 will come into contact with the planar portion 20, and the second tabs 48 will come into contact with the ledge 32. However, by applying further force on the first tabs 46 and the second tables 48, the first wall 38 and the second wall 40 will be pried apart slightly, which will allow the planar portion 20 and the ledge 32 to slide past the first tabs 46 and the second tabs 48, respectively. Once the planar portion 20 and the ledge 32 have moved past the first tabs 46 and the second tabs 48, respectively, the first wall 38 and the second wall 40 will revert to their original configuration. The first tabs 46 and the second tabs 48 will now act to hold the attachment portion 16 in place within the cover portion 18.

To remove the attachment portion 16 from the cover portion 18, the first wall 38 and the second wall 40 may be pried apart slightly, such that the first tabs 46 and the second tabs 48 no longer engage with the planar portion 20 and the ledge 32, respectively. Accordingly, the attachment portion 16 can then be pulled up from within the cover portion 18 and detached.

It will be appreciated by those skilled in the art that the preferred embodiment has been described in some detail but that certain modifications may be practiced without departing from the principles of the invention.

The invention claimed is:

1. A corner bracket for securing an elongated accessory to a corner of a structure comprising first and second structural elements substantially perpendicular to each other, said corner bracket comprising:
    an attachment portion comprising:
        a planar portion comprising one or more openings adapted to receive fasteners for attachment of said planar portion to said first structural element proximate to said corner;
        a body portion extending substantially perpendicular from and proximate to one end of said planar portion, said body portion comprising a partial cutout adapted to allow for passage therethrough of said accessory, wherein at least a portion of said body portion is adapted to engage with said second structure element; and
        an arm extending from said body portion; and
    a cover portion removably attached to said attachment portion, said cover portion comprising:
        a base comprising a curved portion, wherein said curved portion is adapted to support said accessory as said accessory transitions between said first and second structural elements;
        a first wall extending substantially perpendicular from at least a first portion of said base, wherein said first wall engages with said planar portion; and
        a second wall extending substantially perpendicular from at least a second portion of said base and spaced apart from and substantially parallel to said first wall, wherein said second wall engages with said arm;
    wherein said attachment portion and said cover portion define a channel for allowing passage therethrough of said accessory; and
    wherein said channel is curved to transition said accessory between said first and second structural elements.

2. The corner bracket of claim 1, wherein said channel extends for the length of said base.

3. The corner bracket of claim 2, wherein said channel comprises a first end and a second end, wherein said first end is a first opening in said corner bracket and said second end is a second opening in said corner bracket.

4. The corner bracket of claim 3, wherein said first opening is defined, at least in part, by said base, said first wall, and said planar portion.

5. The corner bracket of claim 4, wherein said second opening is defined, at least in part, by said partial cutout and said second wall.

6. The corner bracket of claim 5, wherein said first opening and said second opening are vertically offset from one another.

7. The corner bracket of claim 1, wherein said arm extends from said body portion in a direction substantially parallel with said planar portion.

8. The corner bracket of claim 7, wherein said arm extends from said body portion at a distance from said planar portion.

9. The corner bracket of claim 8, wherein said attachment portion further comprises an open slot defined, at least in part, by said planar portion, said body portion and said arm.

10. The corner bracket of claim 1, wherein said base comprises a planar section proximate to one end of said base.

11. The corner bracket of claim 1, wherein said arm comprises:
    a ledge; and
    an upright member extending substantially perpendicular to said ledge.

12. The corner bracket of claim 11, wherein said second wall engages with said ledge.

13. The corner bracket of claim 12, wherein said first wall comprises one or more first tabs, wherein said first tabs engages with said planar portion.

14. The corner bracket of claim 13, wherein said second wall comprises one or more second tabs, wherein said second tabs engages with said arm.

15. A corner bracket for securing an elongated light strip to a corner of a railing system comprising a railing and a post substantially perpendicular to said railing, said corner bracket comprising:
    an attachment portion comprising:
        a planar portion comprising one or more openings adapted to receive fasteners for attachment of said planar portion to said railing proximate to said corner;
        a body portion extending substantially perpendicular from and proximate to one end of said planar portion, said body portion comprising a partial cutout adapted to allow for passage therethrough of said light strip, wherein at least a portion of said body portion is adapted to engage with said post; and
        an arm extending from said body portion; and
    a cover portion removably attached to said attachment portion, said cover portion comprising:

a base comprising a curved portion, wherein said curved portion is adapted to support said light strip as said light strip transitions between said railing and said post;

a first wall extending substantially perpendicular from at least a first portion of said base, wherein said first wall engages with said planar portion; and a second wall extending substantially perpendicular from at least a second portion of said base and spaced apart from and substantially parallel to said first wall, wherein said second wall engages with said arm;

wherein said attachment portion and said cover portion define a channel for allowing passage therethrough of said light strip; and wherein said channel is curved to transition said light strip between said railing and said post.

16. The corner bracket of claim 15, wherein said arm comprises:

a ledge; and an upright member extending substantially perpendicular to said ledge.

17. The corner bracket of claim 16, wherein said second wall engages with said ledge.

18. The corner bracket of claim 17, wherein said first wall comprises one or more first tabs, wherein said first tabs engages with said planar portion.

19. The corner bracket of claim 18, wherein said second wall comprises one or more second tabs, wherein said second tabs engages with said arm.

20. The corner bracket of claim 15, wherein said attachment portion further comprises an open slot, defined at least in part by said planar portion, said body portion and said arm.

* * * * *